_United States Patent_ [19]

Dobreski et al.

[11] Patent Number: 4,786,678

[45] Date of Patent: Nov. 22, 1988

[54] METHOD OF PRODUCING FILMS FROM POLYETHYLENE RESIN, AN ADDITIVE AND A SECOND POLYMERIC RESIN

[75] Inventors: David V. Dobreski, Fairport; Jack J. Donaldson, Rochester; Bruce E. Nattinger, Fairport, all of N.Y.

[73] Assignee: Mobil Oil Corporation, New York, N.Y.

[21] Appl. No.: 191,727

[22] Filed: May 6, 1988

Related U.S. Application Data

[63] Continuation of Ser. No. 947,214, Dec. 29, 1986, abandoned.

[51] Int. Cl.[4] .......................... C08J 3/22; C08L 23/04; C08L 23/18
[52] U.S. Cl. .................................. 524/528; 525/240; 525/184; 525/199; 523/206; 523/351
[58] Field of Search ................ 524/528; 525/240, 184; 523/206, 351

[56] References Cited

U.S. PATENT DOCUMENTS

| | | | |
|---|---|---|---|
| 3,413,249 | 11/1968 | Luftglass | 523/351 |
| 3,455,871 | 7/1969 | Coover et al. | 524/528 |
| 3,755,244 | 8/1973 | Hart | 523/351 |
| 3,894,117 | 7/1975 | Agouri et al. | 525/240 |
| 4,529,764 | 7/1985 | McKinney et al. | 524/528 |
| 4,579,912 | 4/1986 | Canterino et al. | 525/240 |
| 4,612,155 | 9/1986 | Wong et al. | 525/184 |
| 4,716,201 | 12/1987 | Canterino et al. | |

FOREIGN PATENT DOCUMENTS

| | | | |
|---|---|---|---|
| 2519038 | 4/1975 | Fed. Rep. of Germany . | |
| 59-157398 | 9/1984 | Japan | 524/528 |
| 000095 | 7/1979 | World Int. Prop. O. | 525/351 |

OTHER PUBLICATIONS

S. H. Morgan, _Color Concentrates,_ Modern Plastics Encyclopedia, 1984–1985, p. 119.
G. A. George, _Color Concentrates,_ Modern Plastics Encyclopedia, 1985–1986, pp. 122–123.

_Primary Examiner_—Carman J. Seccuro
_Attorney, Agent, or Firm_—Alexander J. McKillop; Michael G. Gilman; Stanislaus Aksman

[57] ABSTRACT

There is disclosed a modified method of preparing a blown polyethylene film made from a blend of major proportion of a polyethylene resin, e.g., LLDPE, a minor proportion of a second polymeric resin, e.g., polystyrene, and at least one additive, e.g., a colorant. The additive or additives are mixed with the second polymeric resin and the resulting mixture is then blended with the polyethylene resin, thereby reducing the number of process steps. Also disclosed is a method of monitoring and/or controlling the second polymeric resin content in the film made with known proportions of a colorant and the second polymeric resin by measuring the light transmission of the film.

31 Claims, No Drawings

METHOD OF PRODUCING FILMS FROM POLYETHYLENE RESIN, AN ADDITIVE AND A SECOND POLYMERIC RESIN

This is a continuation of application Ser. No. 947,214, filed on Dec. 29, 1986, now abandoned.

BACKGROUND OF THE INVENTION

1. Field of the Invention

This invention is directed to a modified method of preparing blown films comprising a major proportion of polyethylene, at least one additive, such as a colorant or an antiblocking agent, and a minor proportion of a second polymeric resin.

2. Description of the Related Art

Linear low and medium density polyethylene copolymers (LLDPE), and linear high density polyethylene (HDPE) are known materials which are widely commercially available. LLDPE is described by Anderson et al., U.S. Pat. No. 4,076,698 which is incorporated herein by reference. HDPE is described, e.g., in KIRK-OTHMER ENCYCLOPEDIA OF CHEMICAL TECHNOLOGY, Third Edition, Vol. 16, pages 421–433, John Wiley and Sons, New York (1981), incorporated herein by reference. A commercially important use of LLDPE and of HDPE is in making bags which are conventionally prepared from films by blown film extrusion. While such films have relatively good properties, they often exhibit low stiffness and have relatively weak MD tear strength characteristics. Accordingly, it has been proposed to improve MD tear strength characteristics of such films by incorporating a small proportion of a second polymeric resin, e.g., aromatic polymeric resins, such as polystyrene or poly(-para-methylstyrene), into the polyethylene film, see Canterino et al, U.S. Pat. No. 4,579,912, the contents of which are incorporated herein by reference. The films of Canterino et al are made by blending separate batches of the polyethylene resin, the aromatic polymeric resin and usually at least one conventional additive, such as a colorant, an anti-blocking agent, or a processing aid, outside of the extruder, or introducing separate streams of the polyethylene resin, the aromatic polymeric resin and the additive(s) into the extruder, and subsequently blow-extruding the film. The resulting film, when viewed under an electron microscope, exhibits a continuing phase of polyethylene containing discrete, distinct microdomains of the aromatic polymeric resin.

To prevent the preferential incorporation or agglomeration of the additive or additives into the microdomains of the aromatic polymeric resin, it was thought necessary to admix the additive or additives with the polyethylene resin, and then combine the resulting mixture with the minor proportion of the aromatic polymeric resin. The polyethylene resin was also used as the carrier for additive(s) because it is customary in the industry to use the predominant resin as the carrier for additives in the preparation of films. Alternatively, as discussed above, separate streams of the polyethylene resin, the aromatic polymeric resin and the additive or additives were introduced into the extruder.

Both methods of feeding the components used for manufacturing the blended film of polyethylene and aromatic polymers were cumbersome and rendered the control of the amount of the additive or additives, and of the second polymeric resin introduced into the extruder, difficult and time consuming. Each of the additive and polymeric streams had to be monitored and controlled individually and the amount of each individual component in the film also had to be determined individually.

Accordingly, it is a primary object of the present invention to simplify the method of preparing a blown polyethylene film from a major proportion of a polyethylene resin, a minor proportion of a second polymeric resin and at least one additive.

It is an additional object of the present invention to provide a convenient yet simple method of monitoring the amount of the second polymeric resin incorporated into the polyethylene film.

Additional objects of the invention will become apparent to those skilled in the art from the following description of the invention.

SUMMARY OF THE INVENTION

A method of preparing a blown polyethylene film from a major proportion of a polyethylene resin, a minor proportion of a second polymeric resin and at least one additive comprises preparing a mixture of the additive or additives with the second polymeric resin as the carrier, blending the mixture with the polyethylene resin and extruding the blend in a blown film extruder.

Another aspect of the invention relates to a method of monitoring and/or controlling the amount of the second polymeric resin incorporated into the film. In this method, the mixture of the additive or additives contains known weight proportions of the colorant (as an additive) and of the second polymeric resin. The amount of the colorant and therefore of the second polymeric resin in film is determined by the light transmission of the film. The content of the second polymeric resin can therefore be easily controlled by controlling the amount of the mixture introduced into the extruder.

DETAILED DESCRIPTION OF THE INVENTION

We found that the use of the second polymeric resin as the carrier for the additive or additives produces a film having properties at least equivalent to those of the film produced by conventional methods, i.e., by adding the additive or additives, the polyethylene resin and the second polymeric resin to the extruder as individual, separate process streams or by using the polyethylene resin as the carrier for the additive(s). This was surprising because traditionally in the production of blown films, if it is desired to prepare a masterbatch of a film additive component in another film component (i.e., a mixture of two components), the major polymeric resin component is used as the carrier. Additionally, in the case of films made from a blend of polyethylene and aromatic polymeric resins, it was thought necessary to use the polyethylene resin, rather than the aromatic polymeric resin, as the carrier for the masterbatch to avoid the agglomeration of the film additive or additives in the microdomains of the aromatic polymeric resin. The film of the invention, when made with a colorant as an additive, has a uniform color, thereby indicating that the additive apparently does not preferentially agglomerate within the microdomains of the aromatic polymeric resin.

The polyethylene resins suitable for use in the method of the invention are any conventional polyethylene resins, but preferably they are linear ethylene polymers now conventionally prepared by low pressure techniques. However, the development is active in the preparation of linear ethylene copolymers under high pressure techniques with suitable catalysts, such as coordination catalysts. Such linear polymers are also suitable for use in this invention. Many suitable linear ethylene polymers are commercially available. Particularly suitable are linear low density polyethylene (LLDPE) resins which are copolymers of ethylene and at least one higher alpha-olefin, such as $C_3$–$C_{10}$ alpha-olefins, preferably $C_4$–$C_8$ alpha-olefins and most preferably 1-butene, 4-methyl-1-pentene, 1-hexene, and 1-octene. These LLDPE copolymers generally have a density of between about 0.90 and about 0.94 g/cc, preferably between about 0.91 and about 0.93 g/cc.

The second polymeric resin is any commercially available resin which can be used in conjunction with the polyethylene resin to prepare the blown film of the invention. Suitable resins are those of thermoplastic polymers of an aromatic hydrocarbon, such as polystyrene and poly(para-methylstyrene), polyamide, high density polyethylene (HDPE) having a density of about 0.940 to about 0.960 g/cc or high pressure, low density polyethylene (LDPE), having a density of about 0.910 to about 0.940 g/cc, prepared by high pressure processes. Polystyrene and poly(para-methylstyrene) resins are particularly preferred as the second polymeric resin. Polymers in which the aromatic monomer is the predominant constituent, such as high impact polystyrene and styrene copolymers are also suitable. The best tear strength is obtained with blends in which the linear ethylene polymer itself has good tear properties. Such blends result in films with good tear and impact properties, and the higher modulus characteristic of a higher density LLDPE film.

The polyamide resins are well known to those skilled in the art, and they usually comprise condensation products containing recurring amide groups as integral parts of the copolymer chains. Polyamides are frequently referred to as "nylons" and, although they are generally considered to be condensation polymers, they can also be formed by addition polymerization. Polyamides and their properties are described in the KIRK-OTHMER ENCYCLOPEDIA OF CHEMICAL TECHNOLOGY, Third Edition, Vol. 18, pages 328–371, John Wiley and Sons, New York, 1982, the contents of the aforementioned passage being incorporated herein by reference. For the purposes of the present invention, the preferred polyamide resins used to prepare the film are selected from the group consisting of Nylon-6, Nylon-9, Nylon-11, Nylon-12, Nylon-6/10, Nylon-6/12, Nylon-6/6 and Nylon-6/9. The most preferred polyamide polymer is Nylon-6. As is known to those skilled in the art, the aforementioned nylon polymers are readily commercially available from Allied Chemical Company, Morristown, N.J. and other companies.

The polyethylene resin is present in the film in the amount of at least about 80, preferably about 90 to about 99.9, and most preferably about 95 to about 99.5% by weight. The second polymeric resin is present in the film in the amount of at least about 0.1%, preferably about 0.1 to about 10 and most preferably about 0.5 to about 5% by weight.

Suitable additive or additives used to prepare the masterbatch are colorants, including $TiO_2$, slip agents, antiblock agents, such as diatomaceous earth, antioxidants, and processing aids, such as fluoroelastomers.

The mixture of the second polymeric resin and the additive or additives, also referred to herein as the masterbatch, is prepared in a conventional manner, e.g., by melt-blending the masterbatch components in a continuous mixer or in a blender. In preparing the masterbatch, a desired amount of the additive or additives is melt-blended with the desired amount of the second polymeric resin carrier. The resulting masterbatch is then used with the polyethylene resin to prepare the film in the method of this invention. The film is made in a conventional manner, e.g., by blow-extruding the blend of the polyethylene and the masterbatch into films having any desired thickness, usually about 0.2 to 5 mils.

In one preferred embodiment of the invention, one colorant is used in the masterbatch in a known weight proportion to the second polymeric resin, e.g., polystyrene resin. For example, the colorant may be used in an amount equal by weight to that of the second polymeric resin. The amount of the second polymeric resin can be easily and conveniently monitored and/or controlled by measuring light transmission of the film since the light transmission is inversely proportional to the amount of the colorant in the film. Since the colorant content in the film is a known fraction of the second polymeric resin content, the decrease or increase in the masterbatch feed rate would result in a corresponding decrease or increase of the second polymeric resin content in the film.

Compatabilizers can be used in small amounts up to about 2 weight percent of the composition but are not necessary. Suitable compatibilizers include block copolymers of styrene-ethylene propylene-styrene (Kraton G), block copolymers of styrene and ethylene (Shelvis) and ethylene propylene copolymers (Vistalon 3707). For purposes of ease of blending and control on a commercial scale it is preferred that the polyethylene resin, such as the LLDPE, and the aromatic polymer be the sole polymeric components.

The film made by the method of this invention finds particular utility in the production of bags usually having handles and gussetts which are in widespread use at supermarket checkout counters. These bags are commonly supplied in packs of 50 or more bags attached to a tear-off tab fitted to a dispenser device for holding the bag open during loading. Bags of this type are disclosed by Kuklies et al., U.S. Pat. No. 4,165,832, which is incorporated herein by reference. However, the utility of the film of the invention is by no means limited to bags with handles and gussetts.

As previously indicated, blending of the polyethylene resin and the masterbatch is done in a conventional manner. Blending can be accomplished by melting the polymers into pellets for future extrusion or by feeding a mixture of the two polymers directly to the extruder. The latter may be preferable in commercial operations because the separate operation of melt blending and its attendant expense is eliminated.

The following Examples further illustrate the essential features of the invention. However, it will be apparent to those skilled in the art that the specific reactants and reaction conditions used in the Examples do not limit the scope of the invention.

COMPARATIVE EXAMPLE A (Film Made by Conventional Method)

The film of this invention was prepared in a conventional manner, according to prior art techniques, by blending the individual component streams in the hopper of the extruder. 94 lbs of Dow LLDPE (94% by weight of total components), 1 lb of 50:50 Superfloss:LLDPE concentrate (corresponding to 5000 ppm of Superfloss in the final film—Superfloss is an antiblocking agent available from Manville Corporation) and 5 lbs (5% by weight) of polystyrene, PS 2120 (available from Mobil Chemical Company) were introduced into an extruder to produce a blown film having the thickness of 0.75 mils. Induced film blocking of the sample was 96, as determined by a Kayeness Blocking Tester following conditioning for 24 hrs at 50 psi at 140° F.

EXAMPLE 1

(Polystyrene As Masterbatch Carrier)

A masterbatch was prepared by mixing the PS 2120 resin with the superfloss antiblocking agent to produce a blend having the same relative proportions of the PS resin and the Superfloss as in Example A. This masterbatch was introduced into the extruder of Example A simultaneously with the Dow LLDPE resin (94.5% by weight of total components) to produce a film having the thickness of 0.75 mils. Induced film blocking, measured in the same manner as in Example A, was 97.

EXAMPLES 2-4

(Minor and Major Resin Components As Additive Carriers)

In these examples, different resin components were used as carriers for the $TiO_2$ colorant. In Example 2, LLDPE was used as the carrier, in Example 3 high melt flow index (MFI of about 20) polystyrene (PS) was used as the carrier and in Example 4, low MFI (MFI of about 5) PS was used as the carrier. The masterbatch in Example 2 contained 50% by weight of the $TiO_2$. Examples 3 and 4 masterbatches contained 40% by weight of $TiO_2$. In all Examples, each masterbatch was blended with Dow LLDPE in such proportions as to result in 3.2% by weight of $TiO_2$ in the final film. The blends were blow-extruded in each Example to produce a film of 0.75 mils.

Light transmission was measured with a Gardner Hazemeter and the results are tabulated below:

| Example | % Light Transmission |
|---|---|
| 2 | 69.1 |
| 3 | 61.9 |
| 4 | 66.8 |

The results indicate that a second polymeric resin, such as polystyrene, can be effectively utilized as a carrier for additives.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A method of preparing a blown polyethylene film from a major proportion of a polyethylene resin, a minor proportion of a second polymeric resin, which is a thermoplastic polymer of styrene, para-methylstyrene or a polyamide, and at least one additive comprising blending the polyethylene resin with a separately-prepared mixture (masterbatch) of the second polymeric resin and said at least one additive and extruding the resulting blend.

2. A method of claim 1 wherein the polyethylene resin is a linear low density polyethylene resin.

3. A method of claim 2 wherein said at least one additive is selected from the group consisting of colorants, slip agents, antiblock agents, antioxidants and processing aids.

4. A method of claim 3 wherein the additive is a colorant or an antiblocking agent.

5. A method of claim 4 wherein the second polymeric resin is a thermoplastic polymer of styrene or para-methylstyrene.

6. A method of claim 5 wherein the film comprises at least about 0.1% by weight of the second polymeric resin.

7. A method of claim 6 wherein the film comprises about 0.1 to about 10% by weight of the second polymeric resin.

8. A method of claim 7 wherein the film comprises about 0.5 to about 5% by weight of the second polymeric resin.

9. A method of claim 8 wherein the film comprises at least about 80% by weight of the polyethylene resin.

10. A method of claim 9 wherein the film comprises about 90 to about 99.9% by weight of the polyethylene resin.

11. A method of claim 10 wherein the film comprises about 95 to about 99.5% by weight of the polyethylene resin.

12. A method of claim 11 wherein the second polymeric resin is a thermoplastic polymer of styrene containing polymerized styrene as its predominant constituent.

13. A method of claim 12 wherein the polymer of styrene is polystyrene.

14. A method of claim 11 wherein the second polymeric resin is a thermoplastic polymer of para-methylstyrene containing polymerized para-methylstyrene as its predominant constituent.

15. A method of claim 13 wherein the linear low density polyethylene resin is a copolymer of ethylene and at least one $C_3$–$C_{10}$ alpha-olefin having a density of about 0.940 g/cc or less.

16. A method of claim 15 wherein the linear low density polyethylene resin is a copolymer of ethylene and at least one $C_4$–$C_8$ alpha-olefin.

17. A method of claim 14 wherein the linear low density polyethylene resin is a copolymer of ethylene and at least one $C_4$–$C_8$ alpha-olefin.

18. A method of claim 16 wherein the linear low density polyethylene resin is a copolymer of ethylene and another alpha-olefin which is 1-butene, 4-methyl-1-pentene, 1-hexene or 1-octene.

19. A method of claim 18 wherein the linear low density polyethylene resin has a density of about 0.9 to about 0.94 g/cc.

20. A method of claim 19 wherein the linear low density polyethylene resin has a density of about 0.91 to about 0.93 g/cc.

21. A method of claim 20 wherein the mixture comprises 50% by weight of the colorant.

22. A method of claim 21 wherein the colorant is TiO$_2$.

23. A method of claim 20 wherein the mixture comprises 40% by weight of the colorant.

24. A method of claim 23 wherein the colorant is TiO$_2$.

25. A method of claim 17 wherein the linear low density polyethylene resin is a copolymer of ethylene and another alpha-olefin which is 1-butene, 4-methyl-1-pentene, 1-hexene or 1-octene.

26. A method of claim 21 wherein the linear low density polyethylene resin has a density of about 0.9 to about 0.94 g/cc.

27. A method of claim 22 wherein the linear low density polyethylene resin has a density of about 0.91 to about 0.93 g/cc.

28. A method of claim 27 wherein the mixture comprises 50% by weight of the colorant.

29. A method of claim 28 wherein the colorant is TiO$_2$.

30. A method of claim 27 wherein the mixture comprises 40% by weight of the colorant.

31. A method of claim 30 wherein the colorant is TiO$_2$.

* * * * *